(12) United States Patent
Sankrithi

(10) Patent No.: US 7,000,869 B2
(45) Date of Patent: Feb. 21, 2006

(54) CROSS SECTION FOR A SUPERSONIC AIRPLANE

(75) Inventor: Mithra M. K. V. Sankrithi, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/668,823

(22) Filed: Sep. 22, 2003

(65) Prior Publication Data

US 2005/0061916 A1    Mar. 24, 2005

(51) Int. Cl.
    *B64C 1/38*    (2006.01)
(52) U.S. Cl. .................. 244/35 A; 244/119; 244/45 R
(58) Field of Classification Search .............. 244/35 A, 244/117 R, 119, 118.5, 118.6, 45 R, 1 N
    See application file for complete search history.

(56) References Cited

U.S. PATENT DOCUMENTS

| | | | |
|---|---|---|---|
| D155,362 S | | 9/1949 | Ray |
| D155,777 S | | 11/1949 | Butler |
| 3,155,348 A | * | 11/1964 | Ricard ........................ 244/119 |
| 4,000,871 A | * | 1/1977 | DeHaai ...................... 244/119 |
| 4,289,287 A | * | 9/1981 | Child et al. ............... 244/45 R |
| 4,483,497 A | * | 11/1984 | Rethorst ...................... 244/15 |
| 4,483,499 A | | 11/1984 | Fronk |
| 4,674,713 A | | 6/1987 | Ryan et al. |
| 4,828,204 A | * | 5/1989 | Friebel ......................... 244/15 |
| 5,024,398 A | | 6/1991 | Riedinger et al. |
| 5,071,088 A | * | 12/1991 | Betts ......................... 244/12.1 |
| 5,086,996 A | * | 2/1992 | Roeder et al. .............. 244/119 |
| 5,090,639 A | | 2/1992 | Miller et al. |
| 5,205,515 A | | 4/1993 | Luria |
| 5,496,000 A | | 3/1996 | Mueller |
| 5,992,797 A | * | 11/1999 | Seidel et al. ............. 244/118.5 |
| 6,158,690 A | | 12/2000 | Wadey et al. |
| 6,394,392 B1 | * | 5/2002 | Lafferty ................... 244/118.1 |
| 6,467,728 B1 | | 10/2002 | Angerami et al. |
| 6,676,079 B1 | | 1/2004 | Takeshima |
| 6,851,650 B1 | * | 2/2005 | Sankrithi ..................... 244/119 |

OTHER PUBLICATIONS

Ole T. Thomsen., "Conceptual Design Principles for Non-Circular Pressurized Sandwich Fuselage Sections—A Design Study Based on a High-Order Sandwich Theory Formulation," http://www.sagepub.co.uk/journals/details/issue/abstract/ab021468.html, published on Feb. 1, 2002. Abstract only.

(Continued)

*Primary Examiner*—Peter M. Poon
*Assistant Examiner*—Timothy D. Collins
(74) *Attorney, Agent, or Firm*—Thomas F. Lebens; Fitch, Even, Tabin & Flannery

(57) ABSTRACT

A fuselage for an airplane comprising a first side of the fuselage having a first curvature; and a second side of the fuselage having a second curvature; wherein the first curvature is different from the second curvature at a substantially vertical cross section of the fuselage. The invention can also be characterized as a cross section of an airplane comprising a first side of a fuselage with a first curvature; a second side of the fuselage with a second curvature that is coupled to the first side of the fuselage; a storage compartment within the fuselage; a seat within the fuselage; and an aisle within the fuselage; wherein the first curvature is different from the second curvature. The invention can reduce or eliminate sonic boom when applied to a supersonic airplane such as a supersonic business jet with a long slender fuselage.

45 Claims, 8 Drawing Sheets

OTHER PUBLICATIONS

Blohm and Voss BV 237 dimensions, http://users.visi.net/~djohnson/bv/vb237.html.

Gotha Go. VI, http://www.geocities.com/asymmetrics/go6.htm, established Aug. 22, 2000.

Me.P.1079/1 and Me.P.1079/16 models, http://www.geocities.com/asymmetrics/go6.htm.

Jim Sugar, "Boomerang!: Rutan's Assymetrical Twin!" Popular Mechanics, http://popularmechanics.com/science/transportation/1996/11/rutan_boomerang/print/phtml, published on Nov. 1, 1996.

Quiet Supersonic Platform, http://www.darpa.mil/tto/programs/qsp.html, last updated on Aug. 29, 2002.

"Baby Boom," Beyond 2000, http://www.beyond2000.com/news Aug_01/story_1253.html, published on Aug. 1, 2001.

Duane Bong, "Sonic Booms," http://www.visionengineer.com/aero/supersonic_boom.shtml, established May 2000.

"Northrop to demonstrate less intense sonic boom," Journal of Aerospace and Defense Industry News, http://www.aerotechnews.com/starc/2001/081001/sonic_boom.html, published on Aug. 10, 2001.

Ensign John Gay, http://www.anomalies-unlimited.com/OddPics/Images/sonicboom.jpg, posted on Jun. 9, 2002.

* cited by examiner

CROSS SECTION FOR A SUPERSONIC AIRPLANE

BACKGROUND OF INVENTION

1. Field of the Invention

The present invention relates generally to airplanes. More specifically, but without limitation thereto, the present invention relates to the body of a supersonic airplane.

2. Discussion of the Background Art

One of the major problems with supersonic airplane travel over land is the sonic boom created by the airplane. It is such a major problem that commercial airlines are prohibited from flying over land at supersonic speeds.

Commercial supersonic airplanes are known in the art. For example, the Concorde jet is capable of traveling from Paris to New York in three hours, 45 minutes at a cruising speed of Mach 2 or 1,370 miles per hour. The Concorde's seating capacity is 100 passengers and it usually has a crew of nine. Daily service between New York and Paris started in 1977. The Concorde is able to fly this route because the majority of the flight is over the Atlantic Ocean. However, a flight from Paris to Los Angeles would not be feasible due to the sonic boom created by the airplane as it flew over much of the United States. When flying over land the Concorde would need to greatly reduce its speed so as not to create a sonic boom. This would substantially defeat the purpose of having a supersonic airplane.

Thus, there would be a much better market for a supersonic airplane if the airplane could fly over land with no sonic boom or very minimal sonic boom. Thus there is a need for an commercial passenger airplane design, such as a business jet design, to eliminate the problems discussed above.

SUMMARY OF INVENTION

The present invention advantageously addresses the need above as well as other needs by providing a low cross-sectional area fuselage designed to travel at supersonic speed while producing no sonic boom or minimal sonic boom.

In one embodiment the present invention includes a fuselage for an airplane comprising a first side of the fuselage having a first curvature; and a second side of the fuselage having a second curvature; wherein the first curvature is different from the second curvature at a substantially vertical cross section of the fuselage.

In another embodiment the invention can be characterized as a cross section of an airplane comprising a first side of a fuselage with a first curvature; a second side of the fuselage with a second curvature which is coupled to the first side of the fuselage; a storage compartment within the fuselage; a seat within the fuselage; and an aisle within the fuselage; wherein the first curvature is different from the second curvature.

In a subsequent embodiment the invention can be characterized as a method of minimizing a sonic boom signature of an airplane comprising determining a plurality of contents which will be located in a cross-sectional area of a fuselage; determining the placement of the plurality of contents which will be located in the cross-sectional area of the fuselage; and minimizing the cross-sectional area of the fuselage such that a sonic boom signature of the airplane is substantially reduced.

In one preferred embodiment the present invention provides for a minimized fuselage cross-sectional area having a reduced sonic boom signature while maximizing seat and aisle comfort and usability.

BRIEF DESCRIPTION OF DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In accordance with the present invention, the embodiments shown provide means for minimizing fuselage cross-sectional area and sonic boom, while maximizing seat and aisle comfort and usability.

A commercial airplane which can travel at super sonic speeds with a minimal or reduced sonic boom would be very advantageous. Many people traveling would greatly benefit from the reduction in traveling time. For example, a business traveler in Los Angeles flying on a super sonic jet would be able to travel to and from a meeting in New York in one day due to the great reduction in flight time provided by the super sonic jet as compared to a traditional commercial airplane. The super sonic jet could reduce the flight time by a half or more as compared to a traditional commercial airplane. On a flight from Los Angeles to New York, this translates into a substantial savings in time. In order to make this possible a commercial airplane, such as a business jet, is needed, which has a reduced sonic boom signature.

In order to achieve minimal or no sonic boom, careful area rule tailoring is needed to achieve a desired sonic boom signature and magnitude. One element of the rule tailoring is the incorporation of a very long and slender fuselage or body for the airplane. Reducing the cross-sectional area of the fuselage is one major measure of merit. Thus, reducing the cross-sectional area of the fuselage is very desirable as this will provide a slender fuselage in relation to the length of the plane. In one embodiment of the present invention the inventive fuselage is both long and slender with a minimal cross-sectional area while still accommodating comfortable seating for passengers and substantial height for boarding, deplaning, and in-flight movement needed for passengers and flight attendants. In another embodiment the inventive cross-section of the fuselage helps minimize cross-sectional area while accommodating comfortable seating for a business traveler and an aisle which can be easily used by the business traveler or a flight attendant.

Figure 1:
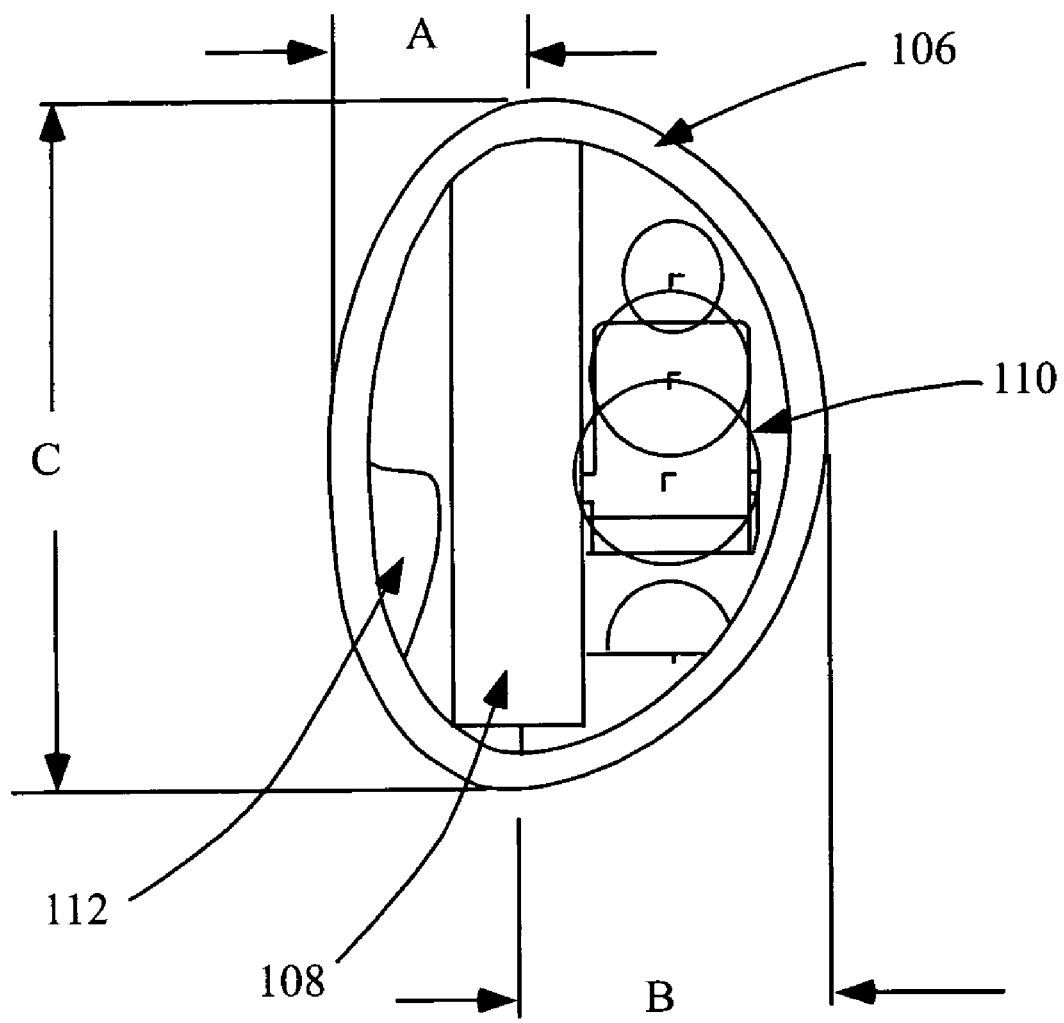
FIG. 1 illustrates a cross-sectional view of the fuselage in accordance with one aspect of the present invention.

FIG. 1 illustrates a cross-sectional view of the fuselage in accordance with one aspect of the present invention. Shown is a height C, a first width A, a second width B, a fuselage 106, an aisle 108, a seat 110, and a storage compartment 112.

Figure 2:
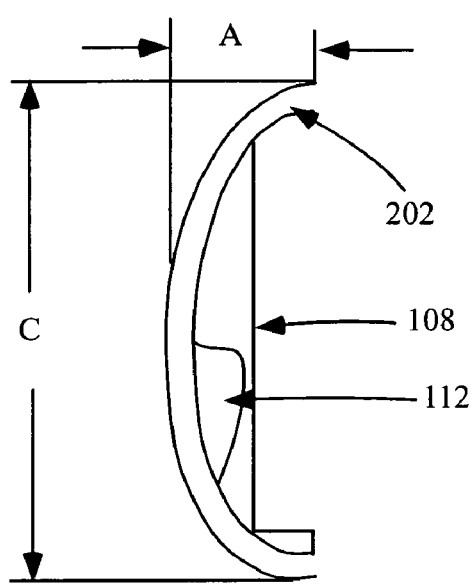
FIG. 2 illustrates a cross-sectional view of a left side of the fuselage shown in FIG. 1.
Figure 3:
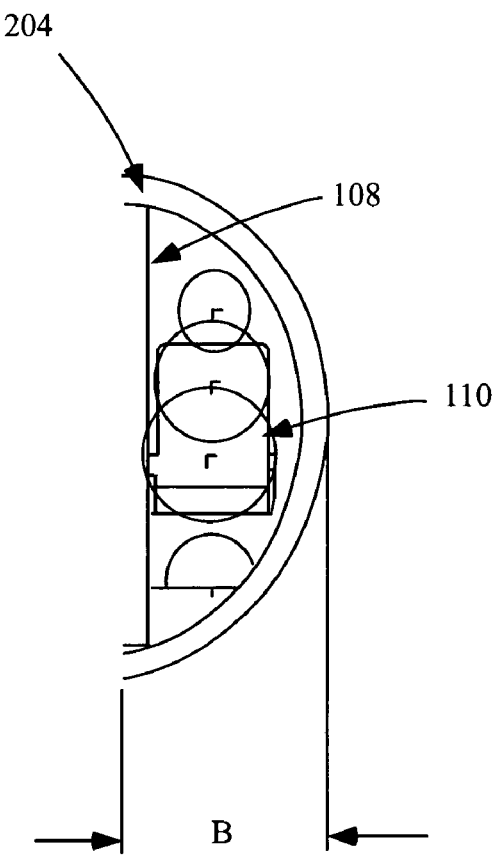
FIG. 3 illustrates a cross-sectional view of a right side of the fuselage shown in FIG. 1.

The fuselage 106, as shown in FIG. 1, has a height C, a first width A, and a second width B. The left side 202 of the fuselage 106, as is shown in FIG. 2, corresponds to the first width A. The right side 204 of the fuselage 106, as is shown in FIG. 3, corresponds to the second width B. In the embodiment shown in FIG. 1 both the left side 202 of the fuselage 106 and the right side 204 of the fuselage 106 are half ellipse cross sections that are joined together forming the inventive fuselage 106.

The storage compartment 112 is coupled to the inside of the left side 202 of the fuselage 106. This provides a storage area for passengers. This allows for the passengers to have carry-on luggage that is accessible during the flight. Business travelers often carry lap top computers which they need access to during the flight, thus it is advantageous to have easily accessible storage compartments 112. Additionally, many business travelers travel to and from a destination for a very short period of time, e.g. one or two days, and thus carry a very minimal amount of personal items. The storage compartment 112 allows the business traveler to carry her luggage on the plane without having to check it in. This benefits the business traveler as they are not wasting valuable time waiting for luggage to be unloaded from a separate cargo compartment of the airplane.

Figure 8:
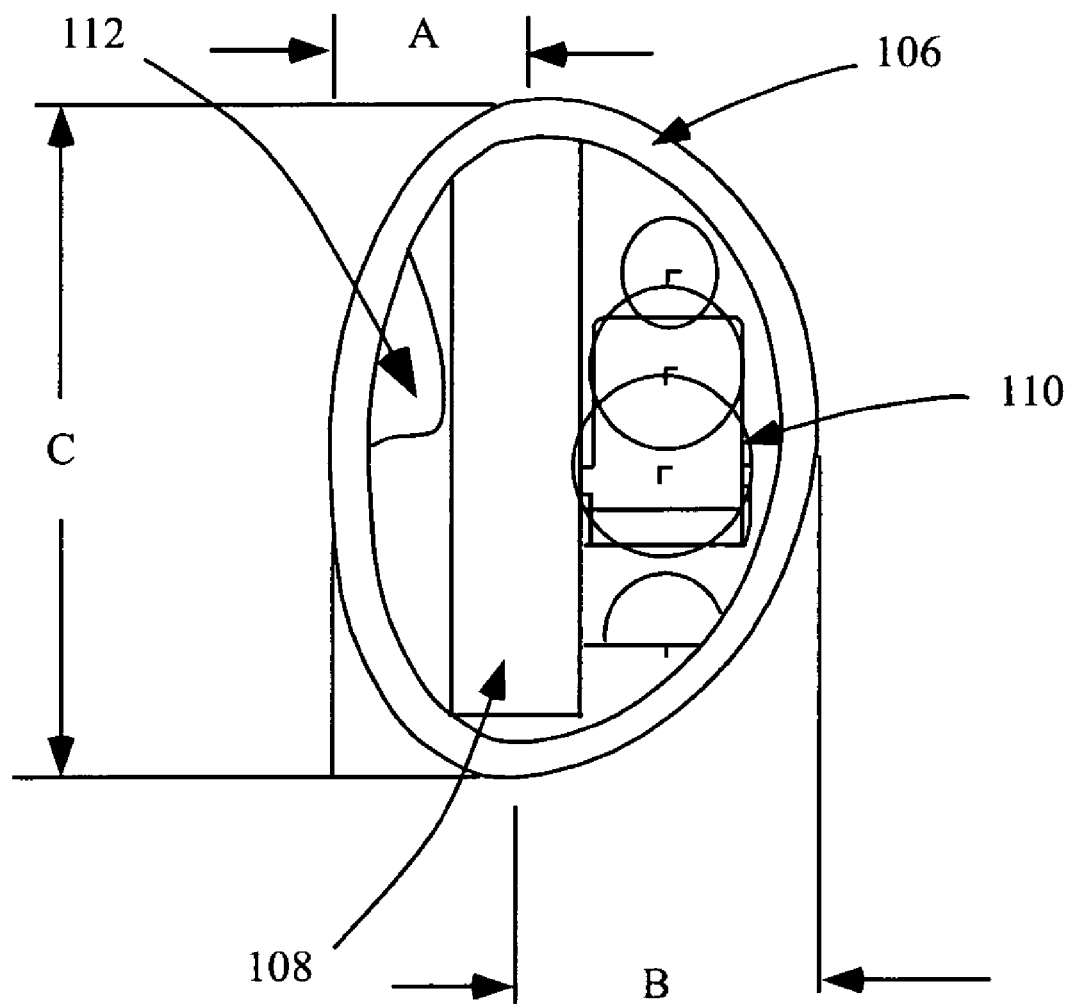
FIG. 8 illustrates a cross-sectional view of a fuselage in accordance with the present invention with a storage compartment near the top of the fuselage.

The storage compartment 112 is designed such that it can store carry on luggage without encroaching into the aisle 108. The storage compartment 112 in FIG. 1 is shown attached near the bottom of the left side 202 of the fuselage 106, however it is within the scope of the present embodiment that the storage area 112 is at the top of the left side 202 of the fuselage 106, as is shown in FIG. 8. Additionally, it is within the scope of the invention that the storage compartment 112 could be located on the right side 204 of the fuselage 106, with the seat either remaining on the right side 204 of the fuselage 106 or being moved to the left side 202 of the fuselage 106. Additionally, it is within the scope of the present invention that there could be a storage compartment 112 located on both the right side 204 of the fuselage 106 and the left side 202 of the fuselage 106.

As is shown in FIG. 3, the seat 110 is located on the right side 204 of the fuselage 106. In one embodiment, the seat 110 is designed for a business traveler. As is known in the art, the seat 110 could be either a business class seat or a first class seat, such as is currently on many airplanes such as airliners and business jets. The business class seat or the first class seat can have a seat-bottom width of at least 18 inches. Additionally, the seat 110 could be an economy class seat which is also well known in the art. It is within the scope of the invention that the seat 110 could be located on either side of the fuselage 106. Advantageously, the seat 110 can be facing the front or back of the airplane. In one embodiment, the airplane can have at least one seat facing the front of the airplane and one seat facing the back of the airplane, such as facing seats to enable occupants to have a face to face conversation. It should be understood that more than one seat could be placed side by side within the fuselage 106.

Figure 5:
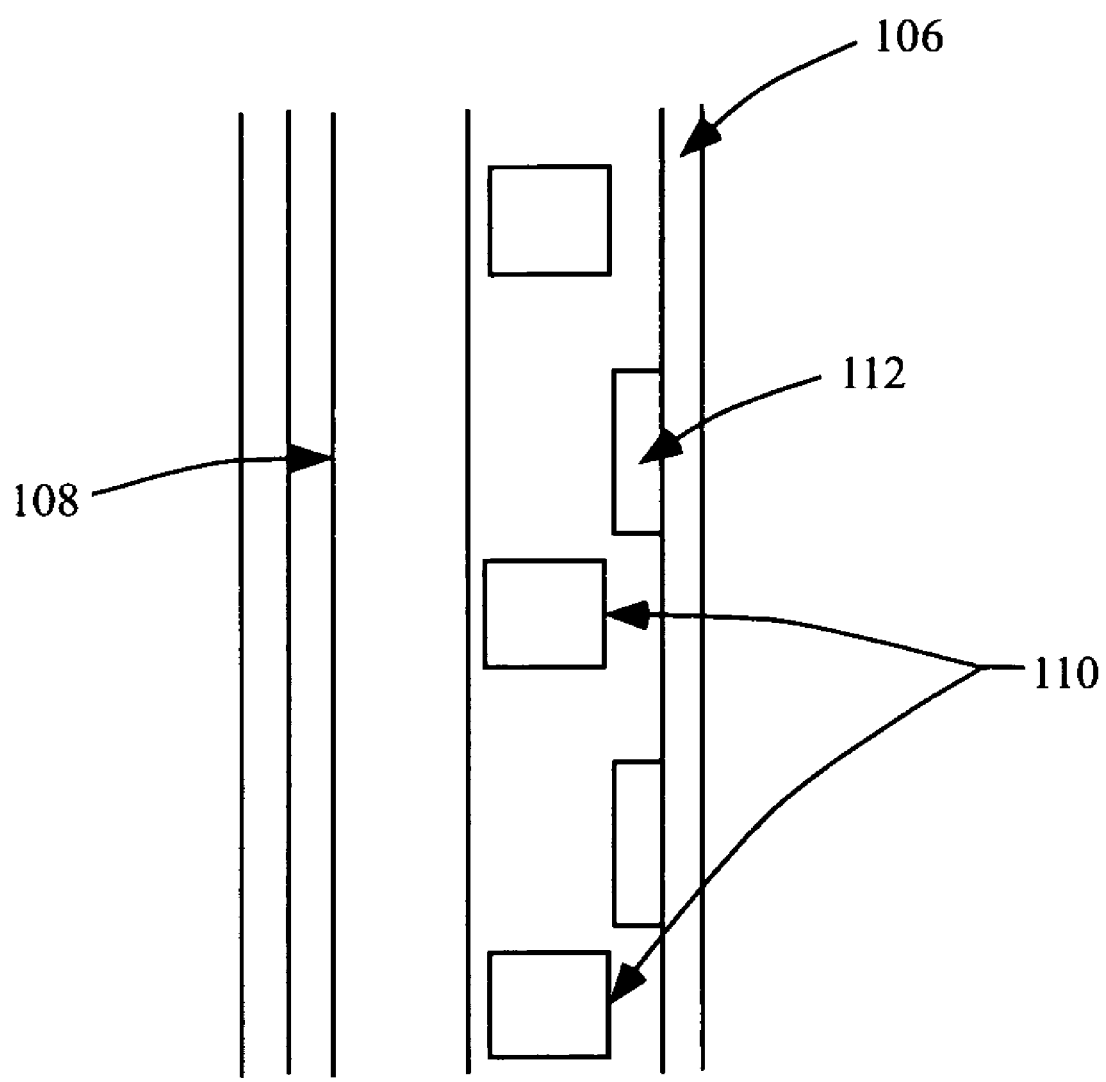
FIG. 5 illustrates a top view of a fuselage in accordance with an embodiment of the present invention with the seats and the storage compartments on the same side of the aisle.

In one embodiment of the present invention, as is shown in FIG. 5, the storage compartment 112 and the seat 110 are located on the same side of the fuselage 106. In one embodiment, the seats 110 could be spaced farther away from each other, from the front to back of the airplane, allowing for the seat 110 and the storage compartment 112 to be on the same side of the fuselage 106 without compromising the comfort of the business traveler. In this embodiment, the cross-sectional area of the fuselage 106 may be further reduced without having to reduce the space for the aisle 108 or the comfort of the business traveler.

In the embodiment shown in FIG. 1, the aisle 108 is located in between the seat 110 and the storage compartment 112. The height of the aisle 108 is limited by the height C of the fuselage 106 less the structural thickness of the fuselage 106. The width of the aisle 108 is limited by the entire width of the fuselage 106, less the thickness of the fuselage 106, the width of the storage compartment 112 and the width of the seat 110. The aisle 108 is large enough to accommodate either the business traveler or a flight attendant moving within the fuselage 106, e.g., using a restroom or serving food and beverages to the travelers. In accordance with an embodiment of the present invention, the aisle 108 has a height of between 60 and 84 inches tall, and more preferably between 68 and 76 inches tall.

FIG. 2 illustrates a cross-sectional view of the left side of the fuselage and the inside of the fuselage. Shown is the first width A, the height C, the left side 202 of the fuselage 106, the storage area 112, and the aisle 108.

FIG. 3 illustrates a cross-sectional view of the right side of the fuselage and the inside of the fuselage. Shown is the second height B, the right side 204 of the fuselage 106, the seat 110 and the aisle 108.

In the embodiment shown in FIGS. 1–3 the left side 202 of the fuselage 106 is the first width A and has a contour that is elliptical. The right side 204 of the fuselage 106 is the second width B and also has a contour that is elliptical. In the embodiment shown, the left side 202 of the fuselage 106 and the right side 204 of the fuselage 106 have a major axis of the ellipse corresponding to a height C. The left side 202 of the fuselage 106 has a minor axis of the ellipse corresponding to the first width A and the right side 204 of the fuselage 106 has a minor axis of the ellipse corresponding to the second width B.

The cross-sectional area of the fuselage 106 is reduced relative to the smallest circular cross-sectional area which also envelops the seat 110 and the aisle 108 within it. Alternatively, the cross-sectional area of the fuselage 106 is reduced relative to the smallest elliptical cross-sectional area with two sides having the same width and same elliptical curve which can still envelope the seat 110 and the aisle 108 within it. More generally, the cross-sectional area of the fuselage 106 with the left side 202 of the fuselage 106 having a first curvature and the right side 204 of the fuselage having a second curvature will be less than the cross-sectional area of a comparative fuselage with two equal curvatures on both sides of the comparative fuselage. Thus, regardless of the curvature of the fuselage 106 the cross-sectional area of the fuselage 106 is always relatively reduced. This helps reduce the sonic boom signature of the airplane.

In one preferred embodiment the height C is 92 inches, the first width A is 25 inches, and the second width B is 42.65 inches. This corresponds to a cross-sectional area of 4902 square inches for the fuselage 106. It should be understood that the present invention should not be limited to such dimensions. Additionally, the first width A could be greater than the second width B.

In another preferred embodiment, the right side 204 of the fuselage 106 has a circular curve while the left side 202 of the fuselage 106 has a different curve, e.g., an elliptical curve, a digitally specified curve, or a conic curve. This allows for more room for the passenger while still reducing the cross-sectional area of the fuselage 106.

As described above, the dimensions of the fuselage 106 can be modified to allow for different aisle 108 and seat 110 arrangements. Additionally the left side 202 of the fuselage 106 and the right side 204 of the fuselage 106 can have contours which are not elliptical, e.g., conic curves, digitally specified curves, and circular curves. Furthermore, the left and right contours can be modified or varied according to longitudinal location along the length of the fuselage, to yield desired area-ruling profiles or other aerodynamic, structural or cabin comfort advantages. Advantageously, by reducing the cross-sectional area of the fuselage as compared to the cross-sectional area of a symmetrical cross-sectional fuselage, the fuselage 106 design reduces the sonic boom signature of the airplane while still creating a comfortable traveling experience.

Modifying the curve characteristics the left side 202 of the fuselage 106 and the right side 204 of the fuselage 106 along with the dimensions of the height and width of the fuselage 106 accommodates different customers preferred aisle 108 and seat 110 arrangements while minimizing the cross-sectional area of the fuselage 106, thus allowing for a supersonic jet which has a minimal sonic boom signature.

In one embodiment, the fuselage 106 can be made from a composite construction. The composite construction helps reduce the weight of the fuselage 106 which helps the airplane's efficiency. Alternatively, the fuselage 106 can be made from other materials, e.g., a metal construction is also possible. It should be understood that the material used in constructing the fuselage 106 can be any material suitable in the art.

Figure 4:
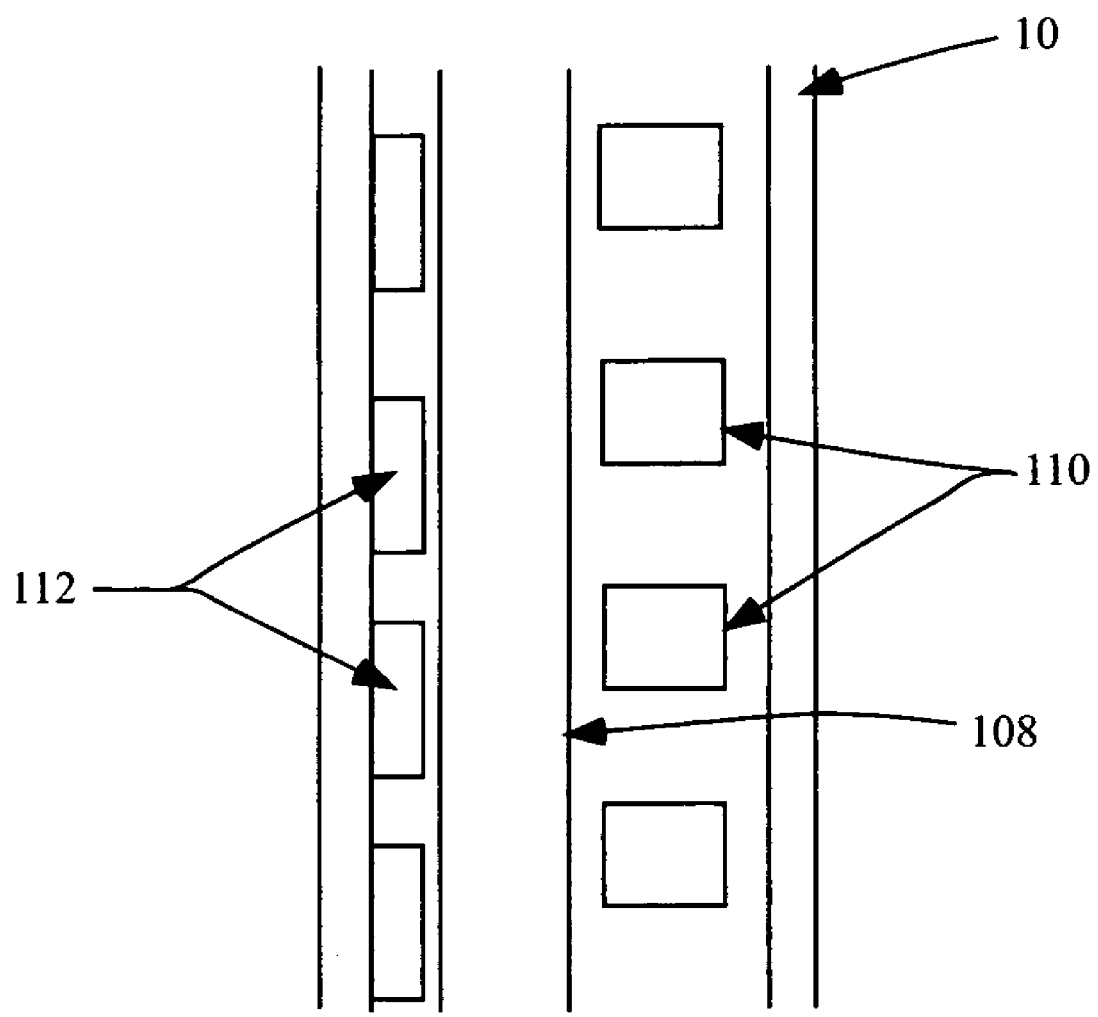
FIG. 4 illustrates a top view of a fuselage shown in FIG. 1 with the seats and the storage compartments on different sides of the aisle.

FIG. 4 illustrates a top view of a fuselage with the seats and the storage compartments on different sides of the aisle. Shown is the fuselage 106, the aisle 108, the storage compartments 112, and the seats 110.

The seats 110 are all to the right side of the aisle 108 within the fuselage 106 while the storage compartments 112 are to the left side of the aisle 108. The configuration shown in FIG. 4 could be used with the fuselage 106 design shown in FIG. 1. Additionally, different curves for the left side 202 of the fuselage 106 and the right side 204 of the fuselage 106 could be designed in accordance with the present invention, e.g., an conic curve, an elliptical curve, a digitally designed curve, or any other curve which can help to minimize the cross-sectional area of the fuselage 106.

FIG. 5 illustrates a top view of a fuselage with the seats and the storage compartments on the same side of the aisle. Shown is the fuselage 106, the aisle 108, the storage compartments 112, and the seats 110.

The seats 110 and the storage compartments 112 are both shown to the right side of the aisle 108 within the fuselage 106. In this configuration, the seats 110 can optionally be moved farther apart such that a person traveling on the airplane does not lose any seating space due to the storage compartment 112 being on the same side of the airplane as the seats 110. As with FIG. 4, many different curves could be used to help minimize the cross-sectional area of the fuselage 106. For Example, the cross-sectional area of the left side 202 of the fuselage 106 could be reduced when the storage compartment 112 is moved to the same side of the fuselage 106 as the seats 110.

Figure 6:
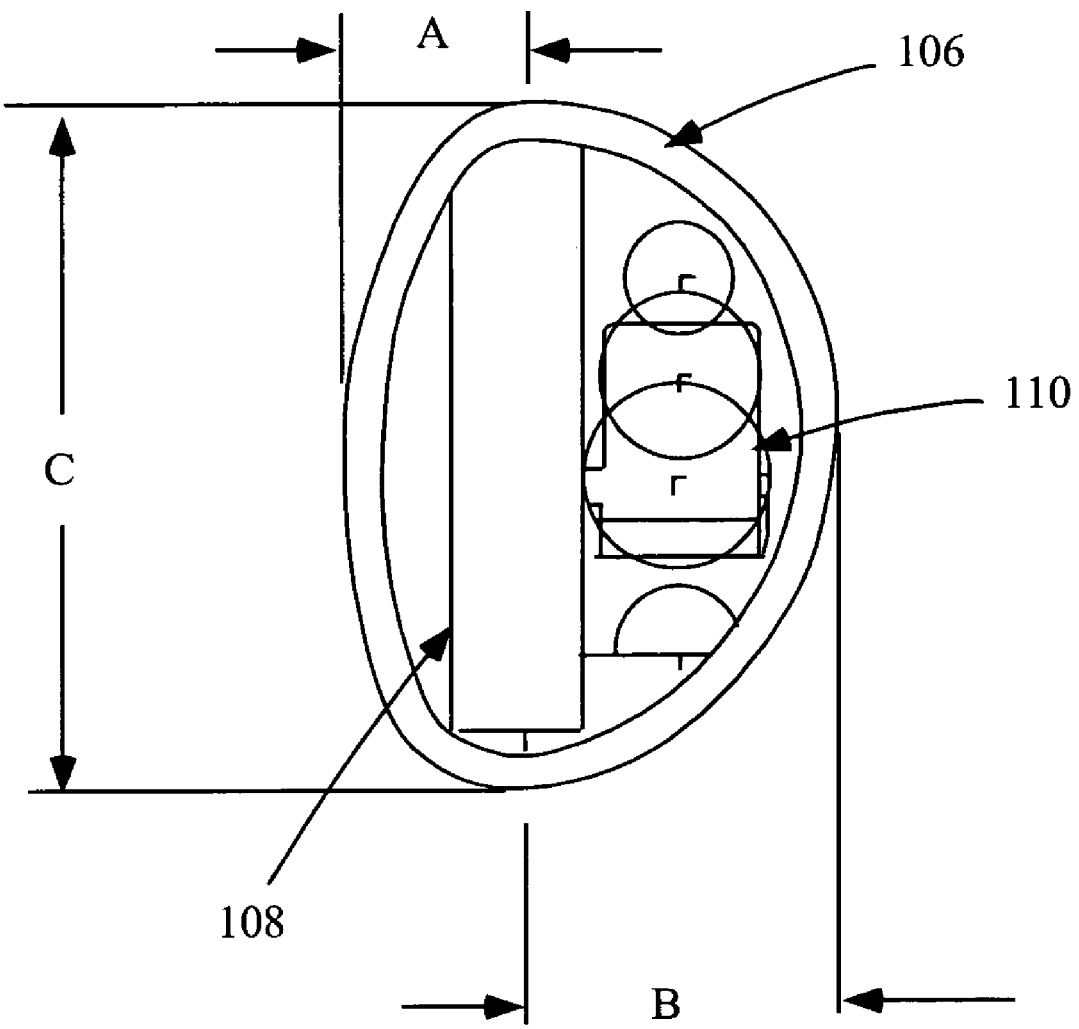
FIG. 6 illustrates a cross-sectional view of the fuselage in accordance with the embodiment shown in FIG. 5.

FIG. 6 illustrates a cross sectional view of the fuselage shown in FIG. 5. Shown is the fuselage 106, the aisle 108, the seat 110, the storage compartment 112, the first width A, the second width B, and the height C.

The configuration shown in FIG. 6 allows the first width A to be reduced from the width shown in FIG. 1 while keeping the width B the same. This allows for a further reduction in the cross-sectional area of the fuselage 106. As discussed above, the curve of the left side 202 of the fuselage 106 could be many different types of curves depending upon the specific needs inside the fuselage.

In one example of the present invention the fuselage 106 shown in FIGS. 1–6 is used for a super sonic business jet. The fuselage 106 of the supersonic business jet is long and slender largely due to the reduced cross sectional area of the fuselage 106. This enables the super sonic business jet to fly over land at super sonic speeds with a greatly reduced sonic boom signature.

It should be well understood in accordance with one embodiment of the present invention that the fuselage 106 of the airplane can have a cross-sectional area as described above with reference to FIGS. 1–6, while a second cross-section which is toward the front or rear of the airplane will have a different cross-sectional area. For example the shape of the fuselage 106 can change as you move from the front of the airplane toward the rear of the airplane with the asymmetrical cross-sections of the present invention applied in critical areas while conventional symmetrical cross sections could be applied to non-critical areas, e.g., possibly the mid-section of the fuselage. Determining non-critical areas and critical areas is very plane specific, however generally for transonic or supersonic flight, it is desirable to have an airplane cross-sectional area distribution as a function of longitudinal position (i.e., distance behind the nose of the airplane) which is shaped like a smoothly curved hill, rising from zero at the nose, rising smoothly to a peak value near the middle of the airplane, and then coming down smoothly back to zero at the tip of the tail. Aerodynamic wave drag and sonic boom are both minimized, if the area distribution is smoother, shallower in slope, and lower in peak value. Note that the cross-sectional area is for the whole airplane, including the body, wing & strake, engines, and tail surfaces. In the part of the cabin at the same longitudinal location as the biggest part of the wing, and at the same longitudinal location as the engines, it becomes critical that the fuselage cross-sectional area is very small, to enable achievement of the preferred area distribution described above. At these longitudinal locations that the small asymmetric cross-section is very beneficial. For a configuration with aft wing and engine locations, this would occur at the aft portion of the passenger cabin. Also, near the very nose of the airplane, the desired cross-sectional area is very small (i.e., at the start of the rising of the area "hill"), so again near the forward end of the cabin a small the cross-sectional area and the asymmetric cross-sectional area would be very beneficial. In other portions of the cabin where the height of the hill is not so small and the wing and engine are not located, a larger cross-sectional area such as a two abreast symmetric cross-sectional areas would be quite possible, and not harm the drag or sonic boom. For a representative airplane with aft wing and engines, this could occur near the middle portion of the passenger cabin, as will be described with reference to FIG. 9. One of skill in the art will understand that the entire length of the fuselage 106 will not have the same cross-sectional area.

The airplane of the present invention could advantageously be equipped with many of the features found on commercial airplanes. For example, the airplane could have windows or skylights in the fuselage 106 for passengers to look out of. Additionally, the fuselage 106 could have emergency exits and entry and exit doors. The inside of the fuselage 106 could have, e.g., a deployable table surface, a video monitor, air control means, reading lights, emergency equipment, noise reduction means, and communication means. The aisle 108 could provide access to a cockpit, a lavatory, and a gallery. Additionally, the fuselage 106 of the airplane could be a pressurized fuselage, such that passengers can fly safely and comfortably at higher altitudes than would otherwise be achievable.

Figure 7:
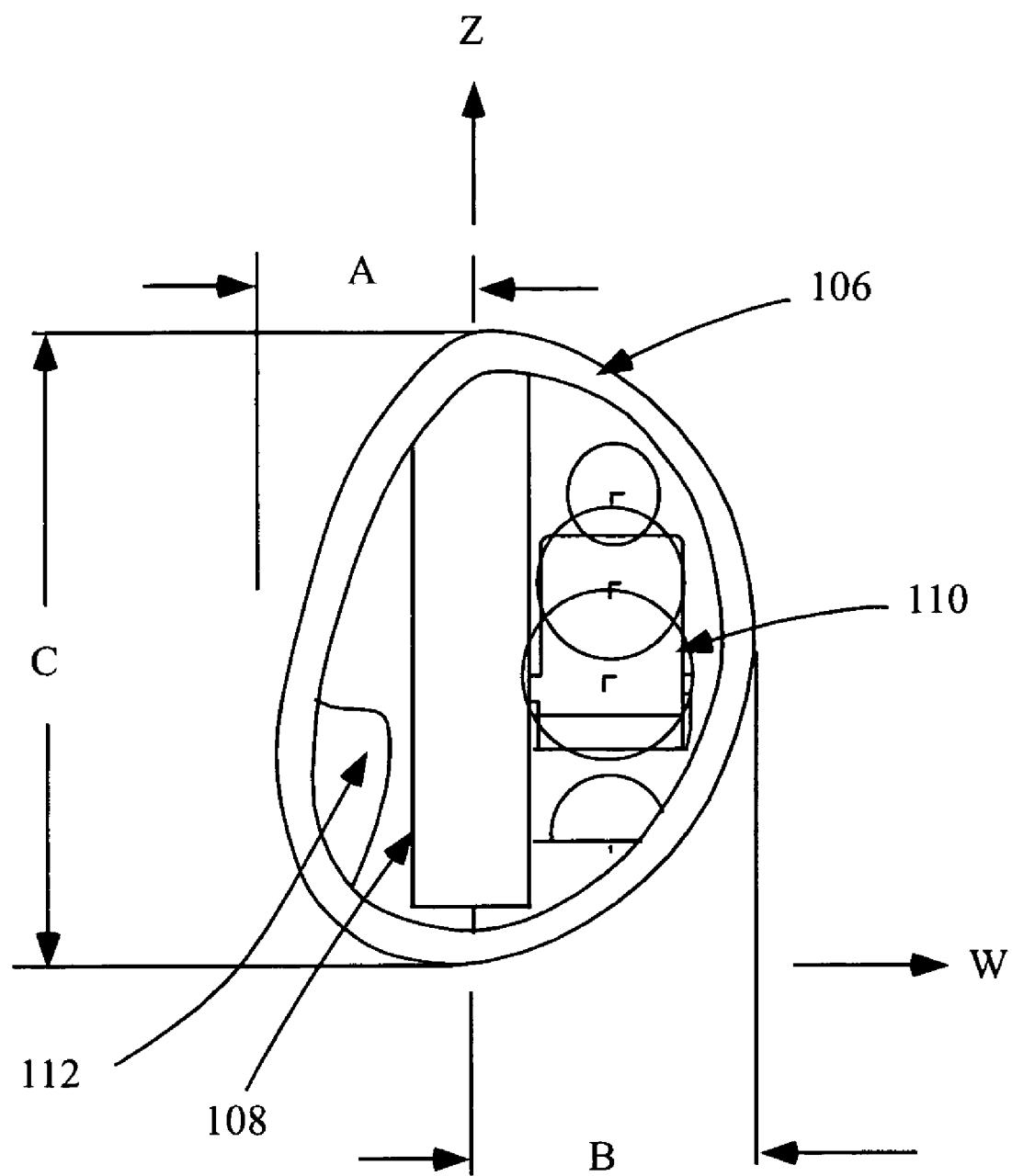
FIG. 7 illustrates a cross-sectional view of a fuselage with a digitally specified curvature in accordance with the present invention.

FIG. 7 illustrates a cross-sectional view of the fuselage in accordance with one embodiment of the present invention. Shown is the first width A, the second width B, the height C, the fuselage 106, the storage compartment 112, the aisle 108, the seat 110, an axis W and an axis Z. The left side 202 of the fuselage 106 is determined using a digital curve.

In the present embodiment, the first width A and the second width B can be equal to those shown in FIG. 1. The left side 202 of the fuselage 106 and the right side 204 of the fuselage 106 have different curves. As shown, the right side 204 of the fuselage 106 is a elliptical curve, such as in FIG. 1, and the left side 202 of the fuselage 106 is a digitally specified curve. This embodiment allows for a storage compartment 112 that is larger than the storage compartment of FIG. 1, while still reducing the cross-sectional area of the fuselage 106. The representative digital curve used for the left side has a left-size width W as a function of height Z above the bottom or keel of the fuselage, where A is the first width and C is the height, specified digitally from the following equation:

$$W=(2A/C)*(1.375-(0.5*Z/C)-(0.5*(Z/C)^2))*SQRT((C/2)^2-((C/2)-Z)^2)$$

FIG. 8 illustrates a cross-sectional view of the fuselage with an storage compartment near the top of the fuselage. Shown is the height C, the first width A, the second width B, the fuselage 106, the aisle 108, the seat 110, and the storage compartment 112.

As is shown in FIG. 8, the storage compartment 112 has been moved toward the top of the fuselage 106. Advantageously, this allows for the storage compartment 112 to be easily accessible when a passenger is standing in the aisle 108.

In accordance with one embodiment of the present invention, an airplane could be designed with a cross-section of the fuselage 106 having two sides with different defined curves. The curves of the fuselage 106 are designed to reduce the cross-sectional area of the fuselage 106 as compared to a fuselage with a symmetrical cross-sectional area. The airplane is then flown over land at supersonic speeds with a reduced sonic boom signature. In one embodiment the sonic boom signature is reduced enough so as not to create a large disturbance to individuals on the ground. This reduction of the sonic boom signature is preferably fostered through the use of a tailored airplane cross-sectional area-rule distribution which has a small maximum value and a smoothly varying hill-like shape, as is understood from the prior art work related to Sears-Haack bodies and supersonic area ruling (see: http://www.pdas.com/wdrefs.htm for example). In accordance with one embodiment of the present invention, a representative Supersonic Business Jet (SSBJ) with a highly-swept wing and aft-located engines is provided, wherein the desired cabin cross-sectional area will typically rise from a small cross-sectional area just behind the cockpit, to a modestly large value in mid-cabin, back down to a small cross-sectional area again near the aft bulkhead of the passenger cabin. For such a representative cabin, it would be highly beneficial to apply the present asymmetrical cross-sectional designs in the critical small cross-sectional area regions at the front and back of the passenger cabin, while the mid-section could still accommodate an adequately tall aisle while using a more conventional symmetric cross-section, perhaps also seating two persons abreast of the aisle, one on each side.

Figure 9:
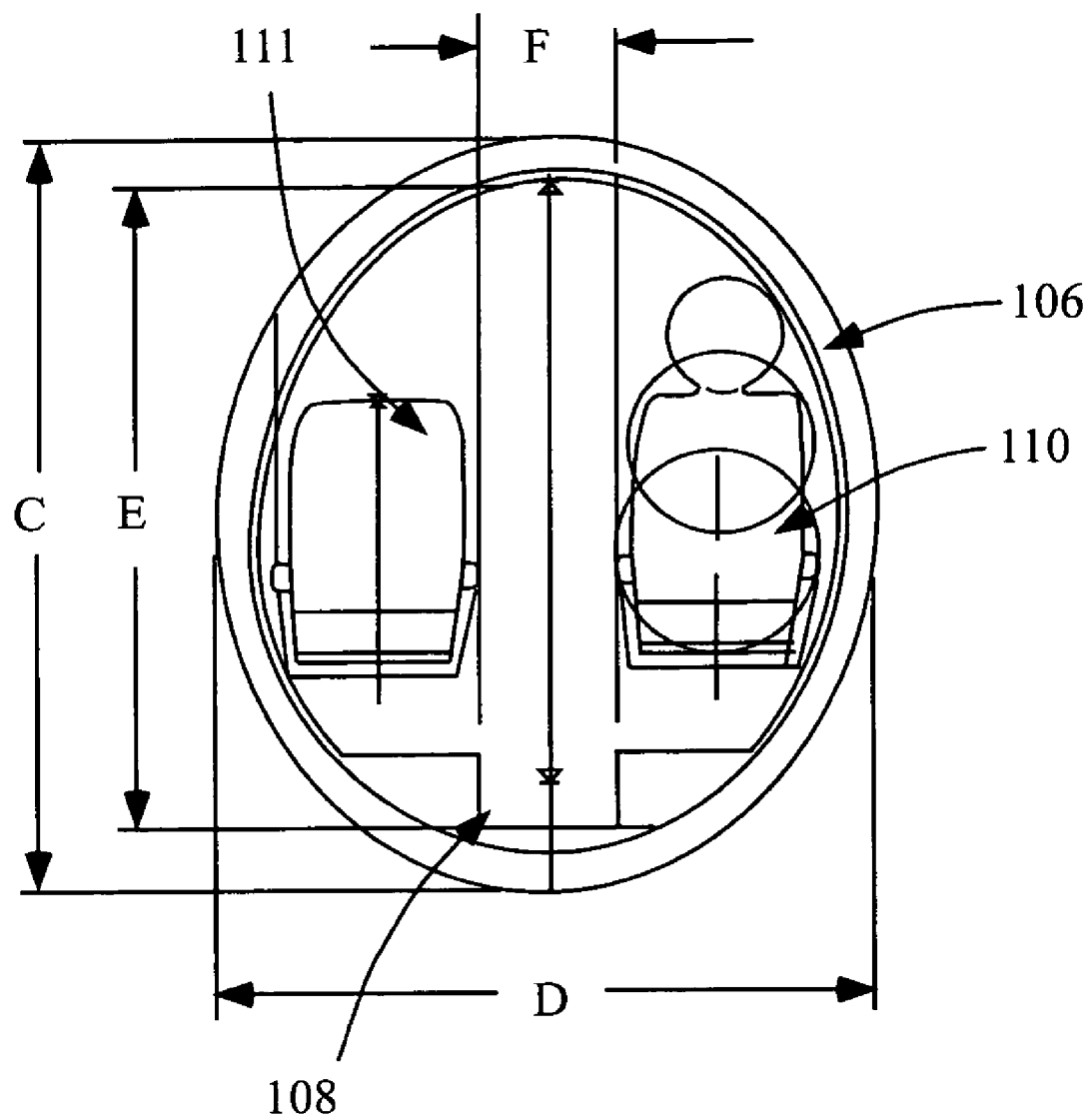
FIG. 9 illustrates a cross-sectional view of a symmetric fuselage in accordance with an embodiment of the present invention.

FIG. 9 illustrates a cross-sectional view of a symmetric cross-section which could be used for some portion of the fuselage such as a midsection, in accordance with an embodiment of the present invention. Shown is a fuselage 106, a first height C, a second height E, a width D, an aisle width F, a first seat 110, a second seat 111, and an aisle 108.

In accordance with the present invention, shown is a symmetrical cross-section to be used on a portion of the fuselage 106. The cross-section of the fuselage 106 is designed such that the cross-section of the fuselage 106 has a minimal cross-sectional area while still accommodating, the first seat 110, the second seat 111, and the aisle 108, in this portion of the fuselage. The cross-sectional area must be reduced enough such that the sonic boom signature is reduced enough so as not to create a large disturbance to individuals on the ground while at the same time providing for comfortable seating and a large enough aisle 108 for passengers to move around the plane.

In a preferred embodiment, the first height C is 90.98 inches, the second height E is 79.00 inches, the width is 80.97 inches, the aisle width is 17 inches, and the cross-sectional area is 5789 square inches. In other embodiments, the curvature of the fuselage could be an elliptical curve, a conic curve or a digitally specified curve. It should be understood the measurements can vary depending upon the thickness of the fuselage, the specified curvature and the required dimensions inside the fuselage.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim:

1. A substantially vertical cross-section of a fuselage for an airplane comprising:
    a first side of the cross-section having a first curvature; and
    a second side of the cross-section having a second curvature;
    wherein a vertical axis passing through a top of the fuselage separates the first side of the cross-section from the second side of the cross-section, wherein the first side of the cross-section is laterally situated on one side of the vertical axis and the second side of the cross-section is laterally situated on an opposite side of the vertical axis;
    wherein the first curvature is different from the second curvature.

2. The fuselage of claim 1 further comprising:
    a first width corresponding to the first side of the cross-section; and a second width corresponding to the second side of the cross-section.

3. The fuselage of claim 2 further comprising:
a storage compartment coupled to the first side of the cross-section; and
a seat inside the cross-section, along substantially all of the longitudinal extent of the fuselage.

4. The fuselage of claim 3 further comprising an aisle in between the seat and the storage compartment.

5. The fuselage of claim 4 wherein the first curvature is an elliptical curve.

6. The fuselage of claim 4 wherein the second curvature is an elliptical curve.

7. The fuselage of claim 4 wherein the first curvature is a circular curve.

8. The fuselage of claim 4 wherein the second curvature is a circular curve.

9. The fuselage of claim 4 wherein the first curvature is a digitally specified curve.

10. The fuselage of claim 4 wherein the second curvature is a digitally specified curve.

11. The fuselage of claim 4 wherein the first curvature is a conic curve.

12. The fuselage of claim 4 wherein the second curvature is a conic curve.

13. The fuselage of claim 1 further comprising;
an aisle inside of the cross-section; and
a seat inside of the cross-section.

14. The fuselage of claim 1 wherein the fuselage is designed to travel at supersonic speed.

15. The fuselage of claim 14 wherein the fuselage is designed to travel over land with a reduced sonic boom signature.

16. The fuselage of claim 1 wherein the first curvature is a curvature selected from the group consisting of elliptical, conic, circular and digitally specified.

17. The fuselage of claim 16 wherein the second curvature is a curvature selected from the group consisting of elliptical, conic, circular and digitally specified.

18. The fuselage of claim 1 further comprising a fuselage height; wherein the cross-sectional area of the fuselage is reduced relative to the smallest circular cross-sectional area of a second fuselage with the same fuselage height.

19. The fuselage of claim 1 further comprising a aisle height; wherein the cross-sectional area of the fuselage is reduced relative to the smallest circular cross-sectional area of a second fuselage with the same aisle height.

20. The fuselage of claim 1 wherein the cross-sectional area of the fuselage is reduced relative to the cross-sectional area of a second fuselage with each half having two equal curvatures.

21. The fuselage of claim 1 further comprising:
a height;
a first width corresponding to the first curvature; and
a second width corresponding to the second curvature.

22. The fuselage of claim 21 wherein the cross-sectional area of the fuselage is reduced relative to the smallest elliptical cross-sectional area of a second fuselage having a second fuselage height equal the height and a second fuselage width of double the greater of the first width and the second width.

23. The fuselage of claim 1 further comprising:
a height;
a first width corresponding to the first curvature; and
a second width corresponding to the second curvature;
wherein the height is greater than the sum of the first width and the second width.

24. The fuselage of claim 23 wherein the first width is less than the second width.

25. A cross section of an airplane comprising:
a first side of a fuselage with a first curvature;
a second sde of the fuselage with a second curvature which is coupled to the first side of the fuselage;
a storage compartment within the fuselage;
a seat within the fuselage; and
an aisle within the fuselage;
wherein a vertical axis passing through a top of the fuselage separates the first side of the fuselage from the second side of the fuselage, wherein the first side of the fuselage is laterally situated on one side of the vertical axis and the second side of the fuselage is laterally situated on an opposite side of the vertical axis;
wherein the first curvature is different from the second curvature.

26. The cross section of the airplane of claim 25 wherein the aisle is between the seat and the storage compartment along substantially all of the longitudinal extent of the fuselage.

27. The cross section of the airplane of claim 25 further comprising:
a first width corresponding to the first side of the fuselage; and
a second width corresponding to the second side of the fuselage.

28. The cross section of the airplane of claim 27 wherein the first curvature is an elliptical curvature; wherein the second curvature is an elliptical curvature; and wherein the second width is greater than the first width.

29. The cross section of the airplane of claim 28 wherein the first width is between 20 and 30 inches; and wherein the second width is between 37.65 and 47.65 inches.

30. The cross section of the airplane of claim 29 wherein the fuselage has a height of between 87 and 97 inches; wherein the cross sectional area of the fuselage is between 4650 and 5150 square inches.

31. The cross section of the airplane of claim 25 wherein the first curvature is an elliptical curve.

32. The cross section of the airplane of claim 25 wherein the second curvature is an elliptical curve.

33. The cross section of the airplane of claim 25 wherein the first curvature is a circular curve.

34. The cross section of the airplane of claim 25 wherein the second curvature is a circular curve.

35. The cross section of the airplane of claim 25 wherein the first curvature is a digitally specified curve.

36. The cross section of the airplane of claim 25 wherein the second curvature is a digitally specified curve.

37. The cross section of the airplane of claim 25 wherein the first curvature is a conic curve.

38. The cross section of the airplane of claim 25 wherein the second curvature is a conic curve.

39. The cross section of the airplane of claim 25 wherein the storage compartment and the seat are on the same side of the aisle.

40. The cross section of the airplane of claim 25 further comprising a window in the fuselage.

41. The cross section of the airplane of claim 25 further comprising a door in the fuselage.

42. The cross section of the airplane of claim 25 further comprising a fuselage height corresponding to the first side of the fuselage and the second side of the fuselage;

wherein the cross sectional area of the fuselage is reduced relative to the smallest circular cross-sectional area of a second fuselage with the same fuselage height.

43. The cross section of the airplane of claim 42 wherein the sonic boom signature of the fuselage has been reduced relative to the sonic boom signature of the second fuselage.

44. The fuselage of claim 25 wherein the cross-sectional area of the fuselage is reduced relative to the cross-sectional area of a second fuselage with each half of the second fuselage having two equal cross-sectional curvatures.

45. The fuselage of claim 44 wherein the sonic boom signature of the fuselage has been reduced relative to the sonic boom signature of the second fuselage.

* * * * *

UNITED STATES PATENT AND TRADEMARK OFFICE
CERTIFICATE OF CORRECTION

PATENT NO. : 7,000,869 B2
APPLICATION NO. : 10/668823
DATED : February 21, 2006
INVENTOR(S) : Sankrithi It is certified that error appears in the above-identified patent and that said Letters Patent is hereby corrected as shown below:

Claim 1, column 8, line 64, after "curvature" insert --along substantially all of the longitudinal extend of the fuselage--.

Claim 3, column 9, lines 6-7, delete "cross-section, along substantially all of the longitudinal extend of the fuselage." and insert --cross-section.--, therefore.

Claim 13, column 9, line 26, after "comprising" delete ";" and insert --:--, therefore.

Claim 25, column 10, line 5, after "second" delete "sde" and insert --side--, therefore.

Claim 25, column 10, line 18, after "curvature" insert --along substantially all of the longitudinal extend of the fuselage--.

Claim 26, column 10, lines 20-22, delete "compartment along substantially all of the longitudinal extend of the fuselage." and insert --compartment.--, therefore.

Claim 30, column 10, line 38, delete "cross sectional" and insert --cross-sectional--, therefore.

UNITED STATES PATENT AND TRADEMARK OFFICE
CERTIFICATE OF CORRECTION

PATENT NO. : 7,000,869 B2
APPLICATION NO. : 10/668823
DATED : February 21, 2006
INVENTOR(S) : Sankrithi It is certified that error appears in the above-identified patent and that said Letters Patent is hereby corrected as shown below:

Claim 42, column 11, line 1, delete "cross sectional" and insert

--cross-sectional--, therefore.

Signed and Sealed this

Twenty-second Day of May, 2007

JON W. DUDAS
*Director of the United States Patent and Trademark Office*